(12) United States Patent
Calumby et al.

(10) Patent No.: US 10,711,125 B2
(45) Date of Patent: Jul. 14, 2020

(54) COMPOSITION COMPRISING HETEROPHASIC PROPYLENE COPOLYMER

(71) Applicant: SABIC GLOBAL TECHNOLOGIES B.V., Bergen op Zoom (NL)

(72) Inventors: Ricardo Bou Reslan Calumby, Maastricht (NL); Kathleen Ann Vandewiele, Diepenbeek (BE); Marc Herklots, Roermond (NL); Martin Alexander Zuideveld, Kelmis (NL); Désirée Marie Louise Seegers, Geleen (NL); Aurora Alexandra Batinas-Geurts, Geleen (NL); Koenraad Johannes Gerardus van Straaten, Susteren (NL)

(73) Assignee: SABIC GlOBAL TECHNOLOGIES B.V., Bergen op Zoom (NL)

(*) Notice: Subject to any disclaimer, the term of this patent is extended or adjusted under 35 U.S.C. 154(b) by 53 days.

(21) Appl. No.: 16/062,190

(22) PCT Filed: Dec. 15, 2016

(86) PCT No.: PCT/EP2016/081169
§ 371 (c)(1),
(2) Date: Jun. 14, 2018

(87) PCT Pub. No.: WO2017/102935
PCT Pub. Date: Jun. 22, 2017

(65) Prior Publication Data
US 2018/0371222 A1  Dec. 27, 2018

(30) Foreign Application Priority Data
Dec. 18, 2015 (EP) .................................... 15201025

(51) Int. Cl.
| | | |
|---|---|---|
| *C08L 23/12* | (2006.01) | |
| *C08K 3/34* | (2006.01) | |
| *C08K 5/098* | (2006.01) | |
| *C08L 23/08* | (2006.01) | |
| *B29C 45/00* | (2006.01) | |
| *C08K 5/00* | (2006.01) | |
| *B29K 23/00* | (2006.01) | |

(52) U.S. Cl.
CPC .......... *C08L 23/12* (2013.01); *B29C 45/0001* (2013.01); *C08K 3/34* (2013.01); *C08K 5/098* (2013.01); *C08L 23/0815* (2013.01); *B29K 2023/14* (2013.01); *C08K 5/0083* (2013.01); *C08L 2205/02* (2013.01); *C08L 2205/24* (2013.01); *C08L 2207/02* (2013.01); *C08L 2314/02* (2013.01)

(58) Field of Classification Search
CPC .. C08L 23/0815; C08L 23/12; C08L 2207/02; C08L 2205/24; C08L 2205/02; C08L 2314/02; B29C 45/0001; C08K 5/098; C08K 3/34; C08K 5/0083; C08K 2013/14
See application file for complete search history.

(56) References Cited

U.S. PATENT DOCUMENTS

| | | |
|---|---|---|
| 4,399,054 A | 8/1983 | Ferraris et al. |
| 4,472,524 A | 9/1984 | Albizzati |
| 4,771,024 A | 9/1988 | Nestlerode et al. |
| 4,866,022 A | 9/1989 | Arzoumanidis et al. |
| 5,093,415 A | 3/1992 | Brady, III et al. |
| 6,825,146 B2 | 11/2004 | Kilty et al. |
| 2007/0213439 A1* | 9/2007 | Wolters et al. ...... C08K 5/0083 524/321 |
| 2009/0048399 A1 | 2/2009 | Reijntjens et al. |
| 2010/0130709 A1 | 5/2010 | Chen et al. |
| 2013/0253124 A1* | 9/2013 | Bernreiter et al. ..... C08L 23/10 524/528 |

FOREIGN PATENT DOCUMENTS

| | | | |
|---|---|---|---|
| EP | 0019330 A | 11/1980 | |
| EP | 1273595 A1 | 1/2003 | |
| EP | 2397517 A1 | 12/2011 | |
| WO | WO-9219653 A1 * | 11/1992 | ............ C08F 4/6543 |
| WO | 9632426 A1 | 10/1996 | |
| WO | 03068828 A1 | 8/2003 | |

(Continued)

OTHER PUBLICATIONS

"Periodic System of the Elements," Handbook of Chemistry and Physics, CRC Press; 1989-1990, 70th Edition.
(Continued)

*Primary Examiner* — Nathan M Nutter
(74) *Attorney, Agent, or Firm* — Cantor Colburn LLP

(57) ABSTRACT

The invention relates to a composition comprising (A) a heterophasic propylene copolymer and (B) a nucleating composition, wherein (A) the heterophasic propylene copolymer consists of (a) a propylene-based matrix, wherein the propylene-based matrix consists of a propylene homopolymer and wherein the propylene-based matrix is present in an amount of 83 to 88 wt %, preferably 84 to 88 wt %, based on the total heterophasic propylene copolymer and (b) a dispersed ethylene-α-olefin copolymer, wherein the dispersed ethylene-α-olefin copolymer is present in an amount of 12 to 17 wt %, preferably of 12 to 16 wt %, based on the total heterophasic propylene copolymer and wherein the sum of the total amount of propylene-based matrix and total amount of the dispersed ethylene-α-olefin copolymer in the heterophasic propylene copolymer is 100 wt %, wherein the amount of ethylene in the ethylene-α-olefin copolymer is 40 to 60 wt % and wherein the heterophasic propylene copolymer has a melt flow index of 35 to 50 g/10 min as determined according to ISO1133 at 230° C. and 2.16 kg and wherein (B) the nucleating composition comprises (i) a first nucleating agent, which comprises a cyclic dicarboxylate salt compound; and (ii) a second nucleating agent, which comprises talc, wherein the cyclic dicarboxylate salt compound has the formula (I):

$$Ph(COO-)_2 Ca^{2+} \qquad (I).$$

19 Claims, No Drawings

(56) References Cited

FOREIGN PATENT DOCUMENTS

| WO | 2006010414 A1 | 2/2006 |
| --- | --- | --- |
| WO | 2007134851 A1 | 11/2007 |
| WO | 2013050384 A2 | 4/2013 |
| WO | 2013124063 A1 | 8/2013 |
| WO | 2014044682 A1 | 3/2014 |
| WO | 2014202603 A1 | 12/2014 |
| WO | 2015091981 A2 | 6/2015 |
| WO | 2015091982 A1 | 6/2015 |
| WO | 2015091983 A1 | 6/2015 |

OTHER PUBLICATIONS

International Search Report for International Application No. PCT/EP2016/081169; International Filing Date: Dec. 15, 2016; dated Feb. 6, 2017; 4 Pages.

Written Opinion of the International Searching Authority for International Application No. PCT/EP2016/081169; International Filing Date: Dec. 15, 2016; dated Feb. 6, 2017; 7 Pages.

\* cited by examiner

COMPOSITION COMPRISING HETEROPHASIC PROPYLENE COPOLYMER

CROSS REFERENCE TO RELATED APPLICATIONS

This application is a 371 of International Application No. PCT/EP2016/081169, filed Dec. 15, 2016, which claims priority to European Application Serial No. 15201025.2 filed Dec. 18, 2015 which are incorporated herein by reference in their entirety.

The invention relates to a composition comprising a heterophasic propylene copolymer, to a process for obtaining such composition, to the use of such composition and articles prepared from such composition.

Heterophasic propylene copolymer, also known as impact propylene copolymers or propylene block copolymers, are an important class of polymers due to their attractive combination of mechanical properties, such as impact strength over a wide temperature range and their low cost. These copolymers find a wide range of applications ranging from the consumer industry (for example packaging and housewares), the automotive industry to electrical applications.

In the field of rigid packaging such as containers, product protection during handling transportation and storage is important. The challenge for such packaging is that that the packaging must retain its integrity throughout. A way to quantify the design and quality of containers is measuring their resistance to top-loading. Top-load testing is also known as 'crush testing' or 'compressive strength testing'. With such top-load test, the packaging material's structural resistance to a compressive load is measured, until the package deforms or collapses.

Top-load testing is important to determine the stackability of containers. Containers having a high top load allow them to be stacked on top of each other without breaking, thereby avoiding the spilling of the contents of the container. A higher top load also means that in order to achieve the same top load (and hence maintain the stackability), less material is needed to make the container. This so-called down-gauging is desirable from an environmental and business perspective as packaging soon becomes waste material and excess material adds cost to the containers.

Therefore, it is an object of the invention to provide a heterophasic polypropylene composition being able to provide a high top load to a container prepared therefrom.

This object is achieved by a composition comprising (A) a heterophasic propylene copolymer and (B) a nucleating composition, wherein (A) the heterophasic propylene copolymer consists of (a) a propylene-based matrix, wherein the propylene-based matrix consists of a propylene homopolymer and wherein the propylene-based matrix is present in an amount of 83 to 88 wt %, preferably 84 to 88 wt %, based on the total heterophasic propylene copolymer and (b) a dispersed ethylene-α-olefin copolymer, wherein the dispersed ethylene-α-olefin copolymer is present in an amount of 12 to 17 wt %, preferably of 12 to 16 wt %, based on the total heterophasic propylene copolymer and wherein the sum of the total amount of propylene-based matrix and total amount of the dispersed ethylene-α-olefin copolymer in the heterophasic propylene copolymer is 100 wt %, wherein the amount of ethylene in the ethylene-α-olefin copolymer is 40 to 60 wt % and wherein the heterophasic propylene copolymer has a melt flow index of 35 to 50 g/10 min as determined according to ISO1133 at 230° C. and 2.16 kg and wherein (B) the nucleating composition comprises (i) a first nucleating agent, which comprises a cyclic dicarboxylate salt compound; and (ii) a second nucleating agent, which comprises talc, wherein the cyclic dicarboxylate salt compound has the formula (I):

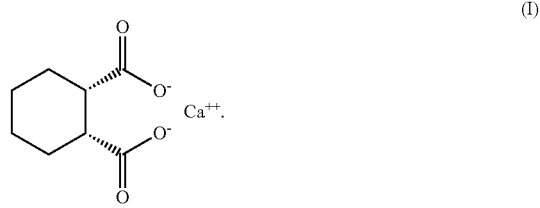

According to the present invention, it has surprisingly been found that the combination of the specific heterophasic propylene copolymer and the nucleating composition leads to a high top load of the composition according to the invention.

It is noted that WO2014/202603 discloses in Table 4 a composition comprising a heterophasic propylene copolymer and a nucleating composition. In the heterophasic propylene copolymer in Table 4, the amount of the dispersed phase is 18.5 wt % and the MFI of the heterophasic propylene copolymer is 33 g/10 min. Such a composition results in a container with a lower top load than the container made from the composition according to the invention.

(A) Heterophasic Propylene Copolymer

Heterophasic propylene copolymers are generally prepared in one or more reactors, by polymerization of propylene in the presence of a catalyst and subsequent polymerization of a propylene-α-olefin mixture. The resulting polymeric materials are heterophasic, but the specific morphology usually depends on the preparation method and monomer ratios used.

The heterophasic propylene copolymers employed in the process according to present invention can be produced using any conventional technique known to the skilled person, for example multistage process polymerization, such as bulk polymerization, gas phase polymerization, slurry polymerization, solution polymerization or any combinations thereof. Any conventional catalyst systems, for example, Ziegler-Natta or metallocene may be used. Such techniques and catalysts are described, for example, in WO06/010414; *Polypropylene and other Polyolefins*, by Ser van der Ven, Studies in Polymer Science 7, Elsevier 1990; WO06/010414, U.S. Pat. Nos. 4,399,054 and 4,472,524.

The heterophasic propylene copolymer of the composition of the invention consists of a propylene-based matrix and a dispersed ethylene-α-olefin copolymer. The propylene-based matrix typically forms the continuous phase in the heterophasic propylene copolymer. The amounts of the propylene-based matrix and the dispersed ethylene-α-olefin copolymer may be determined by NMR, as well known in the art.

The propylene-based matrix consists of a propylene homopolymer

The propylene-based matrix is present in an amount of 83 to 88 wt %, for example 84 to 88 wt %, based on the total heterophasic propylene copolymer.

The propylene-based matrix is preferably semi-crystalline, that is it is not 100% amorphous, nor is it 100% crystalline. For example, the propylene-based matrix is at least 40% crystalline, for example at least 50%, for example at least 60% crystalline and/or for example at most 80% crystalline, for example at most 70% crystalline. For example, the propylene-based matrix has a crystallinity of 60 to 70%. For purpose of the invention, the degree of crystallinity of the propylene-based matrix is measured using differential scanning calorimetry (DSC) according to ISO11357-1 and ISO11357-3 of 1997, using a scan rate of 10° C./min, a sample of 5 mg and the second heating curve using as a theoretical standard for a 100% crystalline material 207.1 J/g.

Besides the propylene-based matrix, the heterophasic propylene copolymer also comprises a dispersed ethylene-α-olefin copolymer. The dispersed ethylene-α-olefin copolymer is also referred to herein as the 'dispersed phase'. The dispersed phase is embedded in the heterophasic propylene copolymer in a discontinuous form. The particle size of the dispersed phase is typically in the range of 0.05 to 2.0 microns, as may be determined by transmission electron microscopy (TEM).

The dispersed ethylene-α-olefin copolymer is present in an amount of 17 to 12 wt %, for example in an amount of 16 to 12 wt %, based on the total heterophasic propylene copolymer.

In the heterophasic polypropylene in the composition of the invention, the sum of the total weight of the propylene-based matrix and the total weight of the dispersed ethylene-α-olefin copolymer is 100 wt %

The amount of ethylene in the ethylene-α-olefin copolymer is in the range of 40 to 60 wt %, for example in the range of 45 to 55 wt %, based on the ethylene-α-olefin copolymer. More preferably, the amount of ethylene in the ethylene-α-olefin copolymer is at least 40 wt %, for example at least 45 wt % and/or for example at most 60 wt %, for example at most 55 wt %.

The α-olefin in the ethylene-α-olefin copolymer is preferably chosen from the group of α-olefins having 3 to 8 carbon atoms and any mixtures thereof, preferably the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer. Examples of suitable α-olefins having 3 to 8 carbon atoms, which may be employed as ethylene comonomers to form the ethylene α-olefin copolymer include but are not limited to propylene, 1-butene, 1-pentene, 4-methyl-1-pentene, 1-hexen, 1-heptene and 1-octene.

Preferably, the amount of ethylene in the heterophasic propylene copolymer (total ethylene content, also referred to as TC2) is 3 to 10 wt %, for example at least 4 wt % or at least 6 wt %, based on the heterophasic propylene copolymer.

Preferably, the propylene-based matrix has a melt flow rate ($MFI_{PP}$ or MFI(PP)) in the range from 60 to 100 dg/min, for example in the range from 75 to 90 dg/min (ISO 1133, 230° C., 2.16 kg). Preferably, the propylene-based matrix has a melt flow rate of at least 60 dg/min, for example at least 65 dg/min, for example at least 70 dg/min, for example at least 75 dg/min and/or for example at most 100 dg/min, for example at most 95 dg/min, for example at most 90 dg/min. For purpose of the invention the melt flow rate is measured ISO 1133 at 230° C. using a load of 2.16 kg.

Preferably, the dispersed ethylene α-olefin copolymer has a melt flow rate ($MFI_{EPR}$ or MFI(EPR)) of at least 0.1 dg/min, at least 0.3 dg/min, at least 0.7 dg/min, and/or for example at most at most 5.0 dg/min. For example the $MFI_{EPR}$ is in the range from 0.50 to 1.5 dg/min, for example in the range from 0.90 to 1.1, for example about 1.0 dg/min The MFI of the dispersed ethylene α-olefin copolymer ($MFI_{EPR}$) is calculated taking into account the MFI of the propylene-based matrix in dg/min ($MFI_{PP}$), the MFI of the heterophasic propylene copolymer in dg/min (MFI(heterophasic)), the amount of the dispersed ethylene-α-olefin copolymer in the heterophasic propylene copolymer (rubber content in wt % (RC)) according to the following formula:

$$MFI(EPR) = 10^{\wedge}\left(\frac{\text{Log } MFI(\text{heterophasic}) - (100 - RC) * \text{Log } MFI(PP)}{RC}\right)$$

The heterophasic propylene copolymer has a melt flow rate (MFI(heterophasic)) in the range from 35 to 50 dg/min, for example in the range from 37 to 50 dg/min, for example in the range from 38 to 50 dg/min, for example in the range from 38 to 45 dg/min (ISO 1133, 230° C., 2.16 kg).

For example, the intrinsic viscosity of the dispersed ethylene-α-olefin elastomer is 1.5 to 2.5.

The intrinsic viscosities of the propylene polymer and of the α-olefin elastomer can be determined from the measured amounts of xylene soluble matter (CXS) and xylene insoluble matter (CXI) according to ISO-1628-1 and -3.

Amount of the xylene-soluble matter (CXS) can be determined according to ISO 16152:2005, which specifies a method for determining the mass fraction of a sample which is soluble in xylene at 25° C. The fraction insoluble in xylene at 25° C. (CXI) fraction of the composition can be determined as the difference of 100 minus the percentage CXS.

Preferably, the propylene-based matrix has a molecular weight distribution as (Mw/Mn) of 3 to 6, wherein Mw stands for the weight average molecular weight and Mn stands for the number average weight, both of which are measured according to ASTM D6474-12 (Standard Test Method for Determining Molecular Weight Distribution and Molecular Weight Averages of Polyolefins by High Temperature Gel Permeation Chromatography).

Preferably, the isotacticity of the heterophasic propylene copolymer is at least 96 wt %. Isotacticity is measured by $^{13}C$ NMR using the procedures known to the skilled person.

Preparation of Heterophasic Propylene Copolymer

The heterophasic propylene copolymer of the invention can be produced using any conventional technique known to the skilled person, for example multistage process polymerization, such as bulk polymerization, gas phase polymerization, slurry polymerization, solution polymerization or any combinations thereof. The heterophasic polypropylene compositions are generally prepared in two or more reactors, for example by polymerization of propylene in the presence of a catalyst system, and subsequent polymerization of an ethylene-α-olefin mixture, preferably wherein the -α-olefin is propylene. Any conventional catalyst systems, for example Ziegler-Natta catalysts or metallocene catalysts may be used. Such techniques and catalysts are described, for example, in *Polypropylene and other Polyolefins*, by Ser van der Ven, Studies in Polymer Science 7, Elsevier 1990; WO06/010414, U.S. Pat. Nos. 4,399,054 and 4,472,524.

For purpose of the invention, all measurements performed on the propylene-based matrix (such as the $MFI_{PP}$, isotacticity and molecular weight distribution) are performed on the sample taken after the propylene has been polymerized and before the polypropylene thus produced is transferred into a subsequent reactor containing ethylene and another α-olefin, preferably propylene. If there are more than one reactor wherein the polypropylene is produced, the sample is taken from the last reactor amongst such reactors wherein the polypropylene is produced.

For purpose of the invention, the measurement of MFI-heterophasic is performed on the sample taken from the reactor containing ethylene and another α-olefin, preferably propylene, from which the heterophasic propylene copolymer is produced. If there are more than one such reactors containing ethylene and another α-olefin subsequent to the reactor for producing polypropylene, the sample is taken from the last reactor amongst such reactors containing ethylene and another α-olefin.

Preferably, the heterophasic propylene copolymer in the composition according to the invention can be prepared using a Ziegler-Natta catalyst. As detailed below, the catalyst may or may not contain phthalate. In some embodiments, the heterophasic propylene copolymer is prepared using a catalyst containing phthalate. Examples of the catalysts containing phthalate include a dialkylphthalate ester in which the alkyl group contains from about two to about ten carbon atoms. Examples of phthalate esters are diisobutylphthalate, ethylbutylphthalate, diethylphthalate, di-n-butylphthalate, bis(2-ethylhexyl)phthalate, and diisodecylphthalate. In some embodiments, the heterophasic propylene copolymer is prepared using a catalyst, wherein the catalyst does not include a catalyst containing phthalate.

Typically, Ziegler-Natta catalyst systems for isotactic polypropylene are heterogeneous by nature, either as a solid, crystalline transition metal compound, like TiCl3, or as transition metal compound supported on MgCl2 and/or an inorganic oxide. It is generally accepted that the surface of the support material or the surface of the solid catalyst plays a crucial role in the ability to produce isotactic polypropylene with Ziegler-Natta catalyst systems. Additionally, the support material in Ziegler-Natta catalyst systems has the role to control the morphology of the resulting polymer powder.

Ziegler-Natta catalyst systems are well known in the art. The term normally refers to catalyst systems comprising a transition metal containing solid catalyst compound (a) and an organo-metal compound (b). Optionally one or more electron donor compounds (external donor) (c) may be added to the catalyst system as well.

The transition metal in the transition metal containing solid catalyst compound is normally chosen from groups 4-6 of the Periodic Table of the Elements (Newest IUPAC notation); more preferably, the transition metal is chosen from group 4; the greatest preference is given to titanium (Ti) as transition metal.

Although various transition metals are applicable, the following is focused on the most preferred one being titanium. It is, however, equally applicable to the situation where other transition metals than Ti are used. Titanium containing compounds useful in the present invention as transition metal compound generally are supported on hydrocarbon-insoluble, magnesium and/or an inorganic oxide, for instance silicon oxide or aluminum oxide, containing supports, generally in combination with an internal electron donor compound. The transition metal containing solid catalyst compounds may be formed for instance by reacting a titanium (IV) halide, an organic internal electron donor compound and a magnesium and/or silicon containing support. The transition metal containing solid catalyst compounds may be further treated or modified with an additional electron donor or Lewis acid species and/or may be subjected to one or more washing procedures, as is well known in the art.

Catalyst System

Preferably, the heterophasic propylene copolymer in the composition according to the invention can be prepared using a Ziegler-Natta catalyst. As detailed below, the catalyst may or may not contain phthalate. In some embodiments, the heterophasic propylene copolymer is prepared using a catalyst containing phthalate.

In the following paragraphs, examples of different Ziegler-Natta catalysts are given by way of their preparation process.

WO/2015/091982 and WO/2015/091981 describe the preparation of a catalyst system suitable for olefin polymerization, said process comprising the steps of:
providing a magnesium-based support;
optionally activating said magnesium-based support;
contacting said magnesium-based support with a Ziegler-Natta type catalytic species, and optionally one or more internal electron donors to yield a procatalyst, and
contacting said procatalyst with a co-catalyst and at least one external donor; wherein the at least one external electron donor is n-propyltriethoxysilane.

WO/2015/091982 and WO/2015/091981 are hereby incorporated by reference. It should be clear to the skilled person that also other external electron donors may be used for preparing a similar catalyst system, for example the external electron donors as exemplified herein.

EP 1 273 595 of Borealis Technology discloses a process for producing an olefin polymerization procatalyst in the form of particles having a predetermined size range, said process comprising: preparing a solution a complex of a Group IIa metal and an electron donor by reacting a compound of said metal with said electron donor or a precursor thereof in an organic liquid reaction medium; reacting said complex, in solution, with at least one compound of a transition metal to produce an emulsion the dispersed phase of which contains more than 50 mol. % of the Group IIa metal in said complex; maintaining the particles of said dispersed phase within the average size range 10 to 200 µm by agitation in the presence of an emulsion stabilizer and solidifying said particles; and recovering, washing and drying said particles to obtain said procatalyst. EP 1275595 and in particular the above described production method, is hereby incorporated by reference.

EP 0 019 330 of Dow discloses a Ziegler-Natta type catalyst composition. Said olefin polymerization catalyst composition is prepared using a process comprising: a) a reaction product of an organo aluminum compound and an electron donor, and b) a solid component which has been obtained by halogenating a magnesium compound with the formula $MgR^1R^2$ wherein $R^1$ is an alkyl, aryl, alkoxide or aryloxide group and $R^2$ is an alkyl, aryl, alkoxide or aryloxide group or halogen, are contacted with a halide of tetravalent titanium in the presence of a halohydrocarbon, and contacting the halogenated product with a tetravalent titanium compound. This production method as disclosed in EP 0 019 330 is incorporated by reference.

The Examples of U.S. Pat. No. 5,093,415 of Dow discloses an improved process to prepare a procatalyst. Said process includes a reaction between titanium tetrachloride, diisobutyl phthalate, and magnesium diethoxide to obtain a solid material. This solid material is then slurried with titanium tetrachloride in a solvent and phthaloyl chloride is added. The reaction mixture is heated to obtain a solid material which is reslurried in a solvent with titanium tetrachloride. Again this was heated and a solid collected. Once again the solid was reslurried once again in a solution of titanium tetrachloride to obtain a catalyst. The Examples of U.S. Pat. No. 5,093,415 are incorporated by reference.

In a preferred embodiment of the process of the invention, the catalyst preparation process comprises the steps of reacting titanium tetrachloride, diisobutyl phthalate, and magnesium diethoxide, and then titanium tetrachloride and phthaloyl chloride and again titanium tetrachloride.

Example 2 of U.S. Pat. No. 6,825,146 of Dow discloses another improved process to prepare a catalyst. Said process includes a reaction between titanium tetrachloride in solution with a precursor composition—prepared by reacting magnesium diethoxide, titanium tetraethoxide, and titanium tetrachloride, in a mixture of ortho-cresol, ethanol and chlorobenzene—and ethylbenzoate as electron donor. The mixture was heated and a solid was recovered. To the solid titanium tetrachloride, a solvent and benzoylchloride were added. The mixture was heated to obtain a solid product. The last step was repeated. The resulting solid procatalyst was worked up to provide a catalyst. Example 2 of U.S. Pat. No. 6,825,146 is incorporated by reference.

U.S. Pat. No. 4,771,024 discloses the preparation of a catalyst on column 10, line 61 to column 11, line 9. The section "catalyst manufacture on silica" is incorporated into the present application by reference. The process comprises combining dried silica with carbonated magnesium solution (magnesium diethoxide in ethanol was bubbled with $CO_2$). The solvent was evaporated at 85° C. The resulting solid was washed and a 50:50 mixture of titanium tetrachloride and chlorobenzene was added to the solvent together with ethylbenzoate. The mixture was heated to 100° C. and liquid filtered. Again $TiCl_4$ and chlorobenzene were added, followed by heating and filtration. A final addition of $TiCl_4$ and chlorobenzene and benzoylchloride was carried out, followed by heating and filtration. After washing the catalyst was obtained.

WO03/068828 discloses a process for preparing a catalyst component on page 91 "preparation of solid catalyst components" which section is incorporated into the present application by reference. Magnesium chloride, toluene, epoxy chloropropane and tributyl phosphate were added under nitrogen to a reactor, followed by heating. Then phthalic anhydride was added. The solution was cooled to −25° C. and $TiCl_4$ was added drop wise, followed by heating. An internal donor was added (1,3-diphenyl-1,3-propylene glycol dibenzoate, 2-methyl-1,3-diphenyl-1,3-propylene glycol dibenzoate, 1,3-diphenyl-1,3-propyleneglycol diprionate, or 1,3-diphenyl-2-methyl-1,3-propylene glycol diprionate) and after stirring a solid was obtained and washed. The solid was treated with $TiCl_4$ in toluene twice, followed by washing to obtain a catalyst component.

U.S. Pat. No. 4,866,022 discloses a catalyst component comprises a product formed by: A. forming a solution of a magnesium-containing species from a magnesium carbonate or a magnesium carboxylate; B. precipitating solid particles from such magnesium-containing solution by treatment with a transition metal halide and an organosilane having a formula: RnSiR'4-n, wherein n=0 to 4 and wherein R is hydrogen or an alkyl, a haloalkyl or aryl radical containing one to about ten carbon atoms or a halosilyl radical or haloalkylsilyl radical containing one to about eight carbon atoms, and R' is OR or a halogen: C. reprecipitating such solid particles from a mixture containing a cyclic ether; and D. treating the reprecipitated particles with a transition metal compound and an electron donor. This process for preparing a catalyst is incorporated into the present application by reference.

In a preferred embodiment, the catalyst preparation process comprises the steps of reacting a magnesium-containing species, a transition metal halide and an organosilane, again with transition metal compound and an electron donor.

The procatalyst used in the catalyst system used according to the present invention may be produced by any method known in the art.

The procatalyst may also be produced as disclosed in WO96/32426A; this document discloses a process for the polymerization of propylene using a catalyst comprising a catalyst component obtained by a process wherein a compound with formula $Mg(OAlk)_xCl_y$, wherein x is larger than 0 and smaller than 2, y equals 2−x and each Alk, independently, represents an alkyl group, is contacted with a titanium tetraalkoxide and/or an alcohol in the presence of an inert dispersant to give an intermediate reaction product and wherein the intermediate reaction product is contacted with titanium tetrachloride in the presence of an internal donor, which is di-n-butyl phthalate (DBP). The preparation of the procatalyst as described in WO96/42326A is hereby incorporated by reference.

The Ziegler-Natta type procatalyst may for example also be the catalyst system that is obtained by the process as described in WO 2007/134851 A1. In Example I the process is disclosed in more detail. Example I including all sub-examples (IA-IE) of WO 2007/134851 A1 is incorporated into the present description. More details about the different embodiments are disclosed starting on page 3, line 29 to page 14 line 29 of WO 2007/134851 A1. These embodiments are incorporated by reference into the present description.

External Donor

The catalyst used may for example be a catalyst system comprising a Ziegler-Natta catalyst and at least one external electron donor chosen from the group of alkoxysilanes.

"external donor" or "external electron donor" or "ED" as used in the present description means: an electron-donating compound used as a reactant in the polymerization of olefins. An ED is a compound added independent of the procatalyst. It contains at least one functional group that is capable of donating at least one pair of electrons to a metal atom.

Mixtures of external donors may be present and may include from about 0.1 mol. % to about 99.9 mol. % of the at least one external donor and from about 99.9 mol. % to about 0.1 mol. % of an additional external donor. In an embodiment, the at least one external electron donor is the only external donor used.

The aluminum/external donor molar ratio in the polymerization catalyst system preferably is between 0.1 and 200; more preferably between 1 and 100. In a Ti-based catalyst, the Si/Ti molar ratio in the catalyst system can range from 0.1 to 40, preferably from 0.1 to 20, even more preferably from 1 to 20 and most preferably from 2 to 10.

For example, the alkoxysilane compound can have any of the structures disclosed herein. The alkoxysilane is described by Formula IX

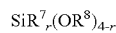 Formula IX $R^7$ is independently a hydrocarbyl group, selected e.g. from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 20 carbon atoms, more preferably from 6 to 12 carbon atoms. For example, R7 may be C6-12 aryl, alkyl or aralkyl, C3-12 cycloalkyl, C3-12 branched alkyl, or C3-12 cyclic or acyclic amino group. The value for r may be 1 or 2.

For the formula $SiR^7_r(OR^8)_{4-r}R^7$ may also be hydrogen.

$R^8$ is independently selected from a hydrogen or a hydrocarbyl group, selected e.g. from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 20 carbon atoms, more preferably from 1 to 12 carbon atoms, even more preferably from 1 to 6 carbon atoms. For example, $R^8$ may be C1-4 alkyl, preferably methyl or ethyl.

Non-limiting examples of suitable silane-compounds include tetramethoxysilane (TMOS or tetramethyl orthosilicate), tetraethoxysilane (TEOS or tetraethyl orthosilicate), methyl trimethoxysilane, methyl triethoxysilane, methyl tripropoxysilane, methyl tributoxysilane, ethyl trimethoxysilane, ethyl triethoxysilane, ethyl tripropoxysilane, ethyl tributoxysilane, n-propyl trimethoxysilane, n-propyl triethoxysilane, n-propyl tripropoxysilane, n-propyl tributoxysilane, isopropyl trimethoxysilane, isopropyl triethoxysilane, isopropyl tripropoxysilane, isopropyl tributoxysilane, phenyl trimethoxysilane, phenyl triethoxysilane, phenyl tripropoxysilane, phenyl tributoxysilane, cyclopentyl trimethoxysilane, cyclopentyl triethoxysilane, diethylamino triethoxysilane, dimethyl dimethoxysilane, dimethyl diethoxysilane, dimethyl dipropoxysilane, dimethyl dibutoxysilane, diethyl dimethoxysilane, diethyl diethoxysilane, diethyl dipropoxysilane, diethyl dibutoxysilane, di-n-propyl dimethoxysilane, d-n-propyl diethoxysilane, di-n-propyl dipropoxysilane, di-n-propyl dibutoxysilane, diisopropyl dimethoxysilane, diisopropyl diethoxysilane, diisopropyl dipropoxysilane, diisopropyl dibutoxysilane, diphenyl dimethoxysilane, diphenyl diethoxysilane, diphenyl dipropoxysilane, diphenyl dibutoxysilane, dicyclopentyl dimethoxysilane, dicyclopentyl diethoxysilane, diethyl diphenoxysilane, di-t-butyl dimethoxysilane, methyl cyclohexyl dimethoxysilane, ethyl cyclohexyl dimethoxysilane, isobutyl isopropyl dimethoxysilane, t-butyl isopropyl dimethoxysilane, trifluoropropyl methyl dimethoxysilane, bis(perhydroisoquinolino) dimethoxysilane, dicyclohexyl dimethoxysilane, dinorbornyl dimethoxysilane, cyclopentyl pyrrolidino dimethoxysilane and bis(pyrrolidino) dimethoxysilane.

In an embodiment, the silane-compound for the additional external donor is dicyclopentyl dimethoxysilane (DCPDMS), di-isopropyl dimethoxysilane (DiPDMS), diisobutyl dimethyoxysilane (DiBDMS), methylcyclohexyl dimethoxysilane (MCDMS), n-propyl trimethoxysilane (NPTMS), n-propyltriethoxysilane (NPTES), diethylamino triethoxysilane (DEATES), and one or more combinations thereof.

Activator

"activator" as used in the present description means: an electron-donating compound containing one or more atoms of oxygen (O) and/or nitrogen (N) which is used during the synthesis of the procatalyst prior to the addition of an internal donor.

Examples of suitable activators are benzamide, alkylbenzoates, and monoesters, such as benzamide, methylbenzamide, dimethylbenzamide, methylbenzoate, ethylbenzoate, ethyl acetate, and butyl acetate. Most preferably ethylbenzoate or ethyl acetate or benzamide are used as activators.

Co-Catalyst

The catalyst system that can be used to prepare the heterophasic propylene copolymer also comprises a co-catalyst. As used herein, a "co-catalyst" is a term well-known in the art in the field of Ziegler-Natta catalysts and is recognized to be a substance capable of converting the procatalyst to an active polymerization catalyst. Generally, the co-catalyst is an organometallic compound containing a metal from group 1, 2, 12 or 13 of the Periodic System of the Elements (Handbook of Chemistry and Physics, 70th Edition, CRC Press, 1989-1990). The co-catalyst may include any compounds known in the art to be used as "co-catalysts", such as hydrides, alkyls, or aryls of aluminum, lithium, zinc, tin, cadmium, beryllium, magnesium, and combinations thereof. The co-catalyst may be a hydrocarbyl aluminum co-catalyst, such as triisobutylaluminum, trihexylaluminum, di-isobutylaluminum hydride, dihexylaluminum hydride, isobutylaluminum dihydride, hexylaluminum dihydride, diisobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, and tritolylaluminum. In an embodiment, the cocatalyst is selected from triethylaluminum, triisobutylaluminum, trihexylaluminum, di-isobutylaluminum hydride and dihexylaluminum hydride. More preferably, trimethylaluminium, triethylaluminium, triisobutylaluminium, and/or trioctylaluminium. Most preferably, triethylaluminium (abbreviated as TEAL). The co-catalyst can also be a hydrocarbyl aluminum compound such as tetraethyl-dialuminoxane, methylaluminoxane, isobutylaluminoxane, tetraisobutyl-dialuminoxane, diethyl-aluminumethoxide, diisobutylaluminum chloride, methylaluminum dichloride, diethylaluminum chloride, ethylaluminum dichloride and dimethylaluminum chloride, preferably TEAL. The molar ratio of aluminum to titanium may be from about 5:1 to about 500:1 or from about 10:1 to about 200:1 or from about 15:1 to about 150:1 or from about 20:1 to about 100:1. The molar ratio of aluminum to titanium is preferably about 45:1. The aluminium/external donor molar ratio in the polymerization catalyst system preferably is from 0.1 to 200; more preferably from 1 to 100.

Internal Electron Donor

The internal electron donor can be any compound known in the art to be used as internal electron donor. Suitable examples of internal donors include aromatic acid esters, such as monocarboxylic acid ester or dicarboxylic acid esters (e.g. ortho-dicarboxylic acid esters such as phthalic acid esters), (N-alkyl)amidobenzoates, 1,3-diethers, e.g fluorenes, 1,5-diethers, silyl esters, succinates, aminobenzoates and/or combinations thereof.

"internal donor" or "internal electron donor" or "ID" as used in the present description means: an electron-donating compound containing one or more atoms of oxygen (O) and/or nitrogen (N).

Phthalate Containing Catalyst

The catalyst may comprise phthalates. Suitable non-limiting examples phthalate containing internal donors include but are not limited to phthalic acid esters include dimethyl phthalate, diethyl phthalate, di-n-propyl phthalate, diisopropyl phthalate, di-n-butyl phthalate, diisobutyl phthalate, di-t-butyl phthalate, diisoamyl phthalate, di-t-amyl phthalate, dineopentyl phthalate, di-2-ethylhexyl phthalate, di-2-ethyldecyl phthalate, bis(2,2,2-trifluoroethyl) phthalate, diisobutyl 4-t-butylphthalate, and diisobutyl 4-chlorophthalate. The phthalic acid ester is preferably di-n-butyl phthalate or diisobutyl phthalate.

Phthalate Free Internal Donor

It is preferred to use so-called phthalate free internal donors because of increasingly stricter government regulations about the maximum phthalate content of polymers. This leads to an increased demand in phthalate free catalyst compositions. In the context of the present invention, "essentially phthalate-free" of "phthalate-free" means having a phthalate content of less than for example 150 ppm, alternatively less than for example 100 ppm, alternatively less than for example 50 ppm, alternatively for example less than 20 ppm based on the total weight of the catalyst.

Suitable non-limiting examples of aromatic acid ester, for example benzoic acid esters include an alkyl p-alkoxybenzoate (such as ethyl p-methoxybenzoate, methyl p-ethoxybenzoate, ethyl p-ethoxybenzoate), an alkyl benzoate (such as ethyl benzoate, methyl benzoate), an alkyl p-halobenzoate (ethyl p-chlorobenzoate, ethyl p-bromobenzoate), and benzoic anhydride. The benzoic acid ester is preferably selected from ethyl benzoate, benzoyl chloride, ethyl p-bromobenzoate, n-propyl benzoate and benzoic anhydride. The benzoic acid ester is more preferably ethyl benzoate.

Suitable examples of 1,3-diethers compounds include but are not limited to diethyl ether, dibutyl ether, diisoamyl ether, anisole and ethylphenyl ether, 2,3-dimethoxypropane, 2,3-dimethoxypropane, 2-ethyl-2-butyl-1,3-dimethoxypropane, 2-isopropyl-2-isopentyl-1,3-dimethoxypropane and 9,9-bis (methoxymethyl) fluorene.

Suitable examples of succinates, for example succinate acid esters include but are not limited to diethyl 2,3-diisopropylsuccinate, diethyl 2,3-di-n-propylsuccinate, diethyl 2,3-di-isobutylsuccinate, diethyl 2,3-di-sec-butylsuccinate, dimethyl 2,3-di-isopropylsuccinate, dimethyl 2,3-di-n-propylsuccinate, dimethyl-2,3-di-isobutylsuccinate and dimethyl 2,3-di-sec-butylsuccinate.

The silyl ester as internal donor can be any silyl ester or silyl diol ester known in the art, for instance as disclosed in US 2010/0130709.

The aminobenzoates may be represented by formula (XI):

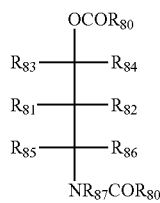

Formula XI wherein:
$R^{80}$, $R^{81}$, $R^{82}$, $R^{83}$, $R^{84}$, $R^{85}$, $R^{86}$ and $R^{87}$ are independently selected from a group consisting of hydrogen or $C_1$-$C_{10}$ hydrocarbyl.

For example, the internal electron donor is selected from the group consisting of 4-[benzoyl(methyl)amino]pentan-2-yl benzoate; 2,2,6,6-tetramethyl-5-(methylamino)heptan-3-ol dibenzoate; 4-[benzoyl (ethyl)amino]pentan-2-yl benzoate, 4-(methylamino)pentan-2-yl bis (4-methoxy)benzoate); 3-[benzoyl(cyclohexyl)amino]-1-phenylbutylbenzoate; 3-[benzoyl(propan-2-yl)amino]-1-phenylbutyl; 4-[benzoyl (methyl)amino]-1,1,1-trifluoropentan-2-yl; 3-(methyl-amino)-1,3-diphenylpropan-1-ol dibenzoate; 3-(methyl)amino-propan-1-ol dibenzoate; 3-(methyl)amino-2,2-dimethylpropan-1-ol dibenzoate, and 4-(methylamino) pentan-2-yl-bis (4-methoxy)benzoate).

The molar ratio of the internal donor relative to the magnesium can be from 0.02 to 0.5. Preferably, this molar ratio is between 0.05 and 0.2.

Examples of benzamides include benzamides according to formula X,

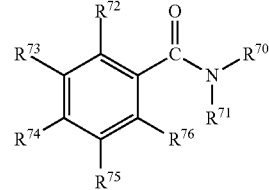

Formula X wherein: $R^{70}$ and $R^{71}$ are each independently selected from hydrogen or an alkyl, preferably an alkyl, more preferably having between 1 and 6 carbon atoms; $R^{72}$, $R^{73}$, $R^{74}$, $R^{75}$, $R^{76}$ are each independently selected from hydrogen, a heteroatom such as a halide, or a hydrocarbyl group selected e.g. from alkyl, alkenyl, aryl, aralkyl, alkoxycarbonyl or alkylaryl groups, and one or more combinations thereof, wherein preferably the activator is N,N-dimethylbenzamide, wherein preferably the benzamide according to formula X is present in the procatalyst in an amount from 0.1 to 4 wt. % as determined using HPLC, for example from 0.1 to 3.5 wt. %, for example from 0.1 to 3 wt. %, for example from 0.1 to 2.5 wt. %, for example from 0.1 to 2.0 wt. %, for example from 0.1 to 1.5 wt. %.

As discussed in WO 2013/124063, hereby incorporated by reference, 1,5-diesters, for example pentanediol dibenzoate, preferably meso pentane-2,4-diol dibenzoate (mPDDB), can be used as internal donors.

In a preferred embodiment, a catalyst system comprising a

Ziegler-Natta catalyst activated with an activator, for example an activator chosen from the group of benzamides and alkylbenzoates, for example dimethylbenzamide, methylbenzoate, ethylbenzoate, ethyl acetate, and butyl acetate, more preferably the activator is ethylbenzoate or benzamide, further comprising as internal donor an internal donor chosen from the group of phthalate-free internal donors, for example chosen from the group of 1,3-diethers, preferably 9,9-bis (methoxymethyl) fluorene or chosen from the group of phthalate-containing internal donors, for example di-n-butyl phthalate or diisobutyl phthalate and further comprising as external donor an external donor chosen from the group of dicyclopentyl dimethoxysilane (DCPDMS), diisopropyl dimethoxysilane (DiPDMS), n-propyltriethoxysilane (NPTES), diethylamino triethoxysilane (DEATES), is used for the preparation of the heterophasic propylene copolymer.

(B) Nucleating Composition

The first nucleating agent in the composition according to the present invention comprises a calcium cis-hexahydrophthalate compound of Formula (I).

Hyperform® HPN-20E™ nucleating agent commercialized by Milliken comprises such a calcium cis-hexahydrophthalate compound of Formula (I) and a stearate-containing compound as acid scavenger, e.g. zinc stearate.

The nucleating composition according to the present invention comprises talc as second nucleating agent.

Talc is a common additive in industry, mostly used as reinforcing agent or filler and also as nucleating agent for various polymer compositions. Talc typically is considered a filler when employed in relatively high amounts, for example of about from 10 to 50 wt %, based on the total polymer composition. When talc is used under 5 wt %, it is no longer considered a filler but acts as nucleating agent.

Talc may be employed in present invention in powder form, preferably having a particle size distribution defined by a $d_{50}$ of from 0.1 to 20 μm; more preferably of from 0.5 to 15 μm; or from 0.7 to 8 μm to improve its nucleating behaviour.

The first nucleating agent and the second nucleating agent can be present in the nucleating composition according to the invention in widely varying amounts, for example in a weight ratio of from 1:1200 to 2:1; preferably in a ratio of from 1:500 to 1:1; more preferably in a ratio of from 1:100 to 1:2; even more preferably in a ratio of from 1:50 to 1:5. The advantage of adding these components within these ratio limits lies in the possibility to control dimensional stability at fast cycle times and mechanical properties.

The nucleating composition may be employed as powder, dry mix or liquid blend. It may be also mixed with other additives to form an additive pre-blend or it may be blended with a binder material in low concentrations, such as a wax or thermoplastic polymer that is compatible with the polymer for which the composition is intended to serve as nucleating agent. The nucleating composition can also be combined with a thermoplastic polymer as a masterbatch or concentrate. These blends may be provided, optionally, with acid scavengers and other additives, such as stabilizers; primary and secondary antioxidants. Suitable acid scavengers can include zinc stearate, calcium stearate or other stearate-based compounds, and hydrotalcite.

The composition according to present invention preferably contains of from 0.0025 to 0.1 wt % of the first nucleating agent based on the total composition. A certain minimum amount of the first nucleating agent is needed to effectively influence nucleating behaviour and properties the composition further comprising talc as nucleating agent; preferably, the nucleating composition contains therefore at least 0.0040, for example at least 0.0050, for example at least 0.0080, for example at least 0.010 wt % of the first nucleating agent. Further increasing the amount of the first nucleating agent in the composition to above 0.25 wt % would hardly contribute to improving the properties of final product. Preferably, the nucleating composition thus contains at most 0.08, 0.06, 0.05, 0.04 wt % of the first nucleating agent. It is a special advantage of the present invention that a relatively low amount of the first nucleating agent can be applied, in combination with the talc-based second nucleating agent; giving not only improved performance but also a cost-effective solution.

The amount of talc used as second nucleating agent in the composition is preferably up to 5.0 wt %, based on the total composition. The amount of talc used as second nucleating agent in the composition is preferably from 0.10 to 5.0 wt %, more preferably from 0.20 to 4.0 wt %; or from 0.30 to 3.0 wt %, based on the total composition. A certain minimum amount of talc is necessary to provide nucleating effect and good mechanical characteristics, such as stiffness. Preferably, the nucleation composition contains thus at least 0.20, 0.30 or even 0.40 wt % of talc. For example, the nucleating composition contains about 0.49 to 0.51 wt % of talc, for example about 0.50 wt % of talc.

If the nucleating composition would contain more than 3.0 wt % of talc, the additional amount might only behave as filler agent. Preferably, the nucleation composition contains therefore at most 4.0 or 3.0 wt % of talc.

(C) Optional Components

The composition according to the invention may further comprise additives as optional components. The additives may include stabilisers, e.g. heat stabilisers, anti-oxidants, UV stabilizers; colorants, like pigments and dyes; clarifiers; surface tension modifiers; lubricants; flame-retardants; mould-release agents; flow improving agents; anti-static agents; blowing agents; inorganic fillers and reinforcing agents; and/or components that enhance interfacial bonding between polymer and filler, such as a maleated polypropylene.

The skilled person can readily select any suitable combination of additives and additive amounts without undue experimentation. The amount of the additives depends on their type and function and for example is of from 0 to about 10 wt %. The amount of the additives may e.g. be from about 0.1 to about 5 wt % based on the total composition.

The sum of all components added in the process of the invention to form the composition comprising (A) the heterophasic propylene copolymer, (B) the nucleating composition and (C) the optional components should add up to 100% by weight.

For example, the total of components (A) and (B) is at least 70 wt %, at least 80 wt %, at least 90 wt %, at least 95 wt %, at least 97 wt %, at least 98 wt %, at least 99 wt %, at least 99.5 wt % of the total composition.

Process

The composition of the invention may be obtained by a process comprising melt-mixing (A) the heterophasic copolymer, (B) the nucleating composition and (C) the optional component by using any suitable means. Accordingly, the invention further relates to a process for the preparation of the composition according to the invention comprising melt mixing (A) and (B) and optionally (C). Preferably, the composition of the invention is made in a form that allows easy processing into a shaped article in a subsequent step, like in pellet or granular form. The composition can be a mixture of different particles or pellets; like a blend of the heterophasic copolymer and a masterbatch of additives. Preferably, the composition of the invention is in pellet or granular form as obtained by mixing all components in an apparatus like an extruder; the advantage being a composition with homogeneous and well-defined concentrations of the additives.

With melt-mixing is meant that the components (B) and optionally (C) are mixed with the heterophasic propylene copolymer at a temperature that exceeds the melting point of the heterophasic propylene copolymer. Melt-mixing may be done using techniques known to the skilled person, for example in an extruder. Generally, in the process of the invention, melt-mixing is performed at a temperature in the range from 20-300° C.

Suitable conditions for melt-mixing, such as temperature, pressure, amount of shear, screw speed and screw design when an extruder is used are known to the skilled person.

When using an extruder, a conventional extruder such as a twin-screw extruder may be used. The temperature can vary through the different zones of the extruder as required.

Further Aspects

The composition according to the invention may for example be used for injection moulding, The invention relates to use of the composition of to the invention for preparing an article, preferably an article that is prepared by injection moulding of the composition of the invention (injection moulded article). The invention further relates to an article comprising the composition of the invention. Preferably, the invention relates to an article that is prepared by injection moulding of the composition of the invention. Examples of such articles are containers, for example pails and caps and closures. The containers may be used for food and non-food applications, e.g. for storage of paint.

Preferably, the article according to the invention is an injection moulded article such as a container, for example a container having a contents in the range from 0.1 to 100 liter, for example in the range from 2.5 to 50 liter.

In another aspect, the invention relates to an article that is prepared from a composition comprising a heterophasic propylene copolymer, which composition when used in injection moulding of a 5 L container without a lid has a top load of at least 4100N. The top load may be measured by conditioning the container at least 10 hours at 22°±1° C. and 48% relative humidity, settling the container between two plates of a dynamometer and compressing with a stress velocity of the plate of 10 mm/min and measuring the stress at collapse of the container as the top load. The composition comprising a heterophasic propylene copolymer is preferably a composition comprising (A) a heterophasic propylene copolymer and (B) a nucleating composition, wherein (A) the heterophasic propylene copolymer consists of (a) a propylene-based matrix, wherein the propylene-based matrix consists of a propylene homopolymer and wherein the propylene-based matrix is present in an amount of 83 to 88 wt %, preferably 84 to 88 wt %, based on the total heterophasic propylene copolymer and (b) a dispersed ethylene-α-olefin copolymer, wherein the dispersed ethylene-α-olefin copolymer is present in an amount of 12 to 17, preferably of 12 to 16 wt %, based on the total heterophasic propylene copolymer and wherein the sum of the total amount of propylene-based matrix and total amount of the dispersed ethylene-α-olefin copolymer in the heterophasic propylene copolymer is 100 wt %, wherein the amount of ethylene in the ethylene-α-olefin copolymer is 40 to 60 wt % and wherein the heterophasic propylene copolymer has a melt flow index of 35 to 50 g/10 min as determined according to ISO1133 at 230° C. and 2.16 kg and wherein (B) the nucleating composition comprises (i) a first nucleating agent, which comprises a cyclic dicarboxylate salt compound; and (ii) a second nucleating agent, which comprises talc, wherein the cyclic dicarboxylate salt compound has the formula (I):

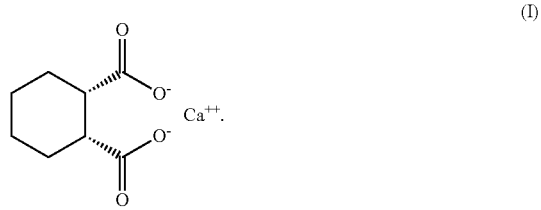

In a special embodiment of the invention, the composition is a composition comprising (A) a heterophasic propylene copolymer and (B) a nucleating composition, wherein (A) the heterophasic propylene copolymer consists of (a) a propylene-based matrix, wherein the propylene-based matrix consists of a propylene homopolymer and wherein the propylene-based matrix is present in an amount of 84 to 88 wt % based on the total heterophasic propylene copolymer and (b) a dispersed ethylene-α-olefin copolymer, wherein the dispersed ethylene-α-olefin copolymer is present in an amount of 12 to 16 wt %, based on the total heterophasic propylene copolymer and wherein the sum of the total amount of propylene-based matrix and total amount of the dispersed ethylene-α-olefin copolymer in the heterophasic propylene copolymer is 100 wt %, wherein the amount of ethylene in the ethylene-α-olefin copolymer is 45 to 55 wt % and wherein the α-olefin is propylene, wherein the heterophasic propylene copolymer has a melt flow index of 35 to 50 g/10 min as determined according to ISO1133 at 230° C. and 2.16 kg and wherein (B) the nucleating composition comprises (i) a first nucleating agent, which comprises a cyclic dicarboxylate salt compound; and (ii) a second nucleating agent, which comprises talc, wherein the cyclic dicarboxylate salt compound has the formula (I):

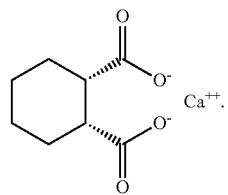

The invention also relates to the use of (B) a nucleating composition in a composition comprising (A) a heterophasic propylene copolymer for improving the top load of an article such as a pail or a container comprising the composition, wherein the composition comprises (A) a heterophasic propylene copolymer, wherein (A) the heterophasic propylene copolymer consists of (a) a propylene-based matrix, wherein the propylene-based matrix consists of a propylene homopolymer and wherein the propylene-based matrix is present in an amount of 83 to 88 wt %, preferably 84 to 88 wt %, based on the total heterophasic propylene copolymer and (b) a dispersed ethylene-α-olefin copolymer, wherein the dispersed ethylene-α-olefin copolymer is present in an amount of 12 to 17, preferably of 12 to 16 wt %, based on the total heterophasic propylene copolymer and wherein the sum of the total amount of propylene-based matrix and total amount of the dispersed ethylene-α-olefin copolymer in the heterophasic propylene copolymer is 100 wt %, wherein the amount of ethylene in the ethylene-α-olefin copolymer is 40 to 60 wt % and wherein the heterophasic propylene copolymer has a melt flow index of 35 to 50 g/10 min as determined according to ISO1133 at 230° C. and 2.16 kg and wherein (B) the nucleating composition comprises (i) a first nucleating agent, which comprises a cyclic dicarboxylate salt compound; and (ii) a second nucleating agent, which comprises talc, wherein the cyclic dicarboxylate salt compound has the formula (I):

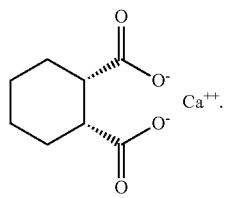

(I)

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

EXAMPLES

Preparation of Heterophasic Copolymer

Gas-phase polymerizations were performed in a set of two horizontal, cylindrical reactors in series, wherein a homopolymer was formed in the first reactor and optionally a typical ethylene-propylene copolymer rubber in the second one to prepare an impact copolymer. The first reactor was operated in a continuous way, the second one in a batch manner. In the synthesis of the homopolymer, the polymer was charged into the secondary reactor blanketed with nitrogen. The first reactor was equipped with an off-gas port for recycling reactor gas through a condenser and back through a recycle line to the nozzles in the reactor. Both reactors had a volume of one gallon (3.8-liter) measuring 10 cm in diameter and 30 cm in length. In the first reactor liquid propylene was used as the quench liquid; for the synthesis of copolymers the temperature in the second reactor was kept constant by a cooling jacket. A high activity catalyst produced in accordance with U.S. Pat. No. 4,866,022 was introduced into the first reactor as a 5-7 wt. % slurry in hexane through a liquid propylene-flushed catalyst addition nozzle. Diisopropylmethoxysilane and TEAl in hexane at an Al/Mg ratio of 4 and Al/Si ratio of 6 were fed to the first reactor through a different liquid propylene flushed addition nozzle. During operation, polypropylene powder produced in the first reactor passed over a weir and was discharged through a powder discharge system into the second reactor. The polymer bed in each reactor was agitated by paddles attached to a longitudinal shaft within the reactor that was rotated at about 50 rpm in the first and at about 75 rpm in the second reactor. The reactor temperature and pressure were maintained at 71° C. and 2.2 MPa in the first and for the copolymer synthesis at 66° C. and 2.2 MPa in the second reactor. The production rate was about 200-250 g/h in the first reactor in order to obtain a stable process. By varying the amount of hydrogen in the first reactor, homopolymers with different melt flow rates were obtained. For the copolymer synthesis, hydrogen was fed independently to both reactors to control a melt flow rate ratio over the homopolymer powder and copolymer powder. The composition of the ethylene-propylene copolymer (RCC2) was controlled by adjusting the ratio ethylene and propylene (C2<=>/C3<=>) in the recycling gas in the second reactor based on gas chromatography analysis. In this respect, RCC2 is the amount of ethylene incorporated in the rubber fraction (wt. %) and RC is the amount of rubber incorporated in the impact copolymer (wt. %) determined by <13>C-NMR spectroscopy.

It should be clear to the skilled person that a phthalate free catalyst may also be used in the process for the preparation of the heterophasic propylene copolymer. For example, the catalyst as described in WO2015/091983 may be used, hereby incorporated by reference.

Reaction conditions were as described in US2009/0048399A1.

Mechanical Properties

The heterophasic propylene copolymer was mixed with a nucleating composition and other additives as described in Table 1.

The amount of the dispersed phase in the heterophasic copolymer and the amount of ethylene in the dispersed phase as measured by NMR are summarized in Table 1.

The MFI of the heterophasic propylene copolymer, the matrix phase and the dispersed phase measured according to ISO1133 (2.16 kg/230° C.) are also summarized in Table 1.

The temperature profile in the extruder was 20-20-30-50-100-170-220-220-240° C., at a throughput of 2.5 kg/h at 300 rpm. Pellets were obtained from the extruder.

Impact strength was determined by measuring the Izod impact strength at 23° C. and 0° C. according to ISO 180 4A. Test geometry: 65*12.7*3.2 mm, notch 45° according to ISO 37/2, parallel and perpendicular orientation.

Flexural modulus was determined according to ASTM D790-10 at 23° C. in parallel (II) and perpendicular orientation (L).

5 L pails were prepared from the compositions in Table 1 using a Stork 440 ton (4000 kN, full electric) injection moulding machine using a 5.2 GL two cavity mould.

The top load of these pails (without lid) was measured by:
conditioning the container at least 10 hours conditioning at 22°±1° C. and 48% relative humidity,
settling the container between two plates of a dynamometer and compressing with a stress velocity of the plate of 10 mm/min and
measuring the stress at collapse of the container as the top load.

The Top Load value reported below is the mean value obtained from measurements repeated on 5 pails.

The impact copolymers used in CE1-5 were the following commercially available impact copolymers: PPC 10642-EU (commercially available from Total), (CE1), 421MN40 (CE3), 612MK46 (CE4) and FPC 55 (CE5) (commercially available from SABIC) and BH381MO (CE2) (commercially available from Borealis).

TABLE 1

|  |  | Ex I | CE1 | CE2 | CE3 | CE4 | CE5 |
|---|---|---|---|---|---|---|---|
| Matrix | wt % based on the heterophasic copolymer | 85 |  |  | 84 | 81.5 | 81.5 |
| RC | wt % based on the heterophasic copolymer | 15 |  |  | 16 | 18.5 | 18.5 |
| RCC2 | wt % based on the rubber phase | 55 |  |  | 58 | 53 | 53 |
| MFI matrix | dg/min | 82 |  |  |  | 82 |  |
| MFI rubber | dg/min | 0.83 |  |  |  | 1.08 |  |
| MFI heterophasic | dg/min | 41.2 | 46.1 | 40.1 | 34.6 | 36.8 | 60.3 |
| Talc | wt % | 0.5 |  |  |  |  | 0.5 |
| HPN20E | wt % | 0.025 |  |  |  |  | 0.025 |
| anti-static agents, clarifiers, antioxidants and acid scavengers | wt % | 0.35 |  |  |  |  | 0.35 |
| Izod impact 23II | kJ/m$^2$ | 6.1 | 4.27 | 5.61 | 7.8 | 6.6 | 5.55 |
| Izod impact 23L | kJ/m$^2$ | 6.6 | 3.81 | 5.19 | 7.48 | 7.62 | 5.37 |
| Izod impact 0II | kJ/m$^2$ | 4.3 | 3.08 | 3.49 |  |  | 4.03 |
| Izod impact 0L | kJ/m$^2$ | 4 | 3.01 | 3.45 | 4.77 | 4.58 | 4.04 |
| Flexural ASTM D790 (T = 23° C., II) | N/mm$^2$ | 1785 | 1829 | 1884 | 1407 | 1432 | 1585 |
| Flexural ASTM D790 (T = 23° C., L) | N/mm$^2$ | 1693 | 1700 | 1888 | 1438 | 1421 | 1548 |
| Top load (N,) | N | 4472 | 3811 | 3236 | 3409 | 3873 | 3996 |

As can be seen from the above table, the inventors have found the composition comprising (A) a heterophasic propylene copolymer and (B) a nucleating composition, wherein (A) the heterophasic propylene copolymer consists of (a) a propylene-based matrix,
wherein the propylene-based matrix consists of a propylene homopolymer and
wherein the propylene-based matrix is present in an amount of 83 to 88 wt %, preferably 84 to 88 wt %, based on the total heterophasic propylene copolymer and (b) a dispersed ethylene-α-olefin copolymer,
wherein the dispersed ethylene-α-olefin copolymer is present in an amount of 12 to 17, preferably of 12 to 16 wt %, based on the total heterophasic propylene copolymer and wherein the sum of the total amount of propylene-based matrix and total amount of the dispersed ethylene-α-olefin copolymer in the heterophasic propylene copolymer is 100 wt %, wherein the amount of ethylene in the ethylene-α-olefin copolymer is 40 to 60 wt % and wherein the heterophasic propylene copolymer has a melt flow index of 35 to 50 g/10 min as determined according to ISO1133 at 230° C. and 2.16 kg and wherein (B) the nucleating composition comprises (i) a first nucleating agent, which comprises a cyclic dicarboxylate salt compound; and (ii) a second nucleating agent, which comprises talc, wherein the cyclic dicarboxylate salt compound has the formula (I):

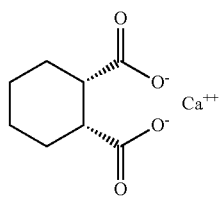

surprisingly shows a high top load, while other properties such as stiffness (flexural modulus) and impact (Izod impact) are maintained.

The invention claimed is:
1. A composition comprising:
(A) a heterophasic propylene copolymer; and
(B) a nucleating composition;

wherein (A) the heterophasic propylene copolymer consists of
(a) a propylene-based matrix, wherein the propylene-based matrix consists of a propylene homopolymer and wherein the propylene-based matrix is present in an amount of 83 to 88 wt %, based on the total heterophasic propylene copolymer,
wherein the propylene-based matrix has a molecular weight distribution as $M_w/M_n$ of 3 to 6, wherein $M_w$ stands for the weight average molecular weight and $M_n$ stands for the number average weight, both of which are measured according to ASTM D6474-12, and
(b) a dispersed ethylene-α-olefin copolymer, wherein the dispersed ethylene-α-olefin copolymer is present in an amount of 12 to 17 wt %, based on the total heterophasic propylene copolymer, and
wherein the sum of the total amount of propylene-based matrix and total amount of the dispersed ethylene-α-olefin copolymer in the heterophasic propylene copolymer is 100 wt %,
wherein the amount of ethylene in the ethylene-α-olefin copolymer is 40 to 60 wt %, and
wherein the heterophasic propylene copolymer has a melt flow index of 35 to 50 g/10 min as determined according to ISO1133 at 230° C. and 2.16 kg, and
wherein (B) the nucleating composition comprises
(i) a first nucleating agent, which comprises a cyclic dicarboxylate salt compound, and
(ii) a second nucleating agent, which comprises talc, wherein the cyclic dicarboxylate salt compound has the formula (I):

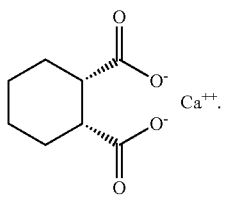

2. The composition according to claim 1, wherein the amount of the dispersed ethylene-α-olefin copolymer is 12 to 16 wt % based on the total heterophasic propylene copolymer and wherein the amount of propylene-based matrix is 84 to 88 wt %.

3. The composition according to claim 1, wherein the amount of ethylene in the ethylene-α-olefin copolymer is 45 to 55 wt % based on the ethylene-α-olefin copolymer.

4. The composition according to claim 1, the heterophasic propylene copolymer has a melt flow index of 38 to 50 g/10 min as determined according to ISO1133 at 230° C. and 2.16 kg.

5. The composition according to claim 1, wherein the α-olefin in the ethylene-α-olefin copolymer is chosen from the group of α-olefins having 3 to 8 carbon atoms and any mixtures thereof.

6. The composition according to claim 1, wherein the weight ratio of the first nucleating agent to the second nucleating agent is 1:50 to 1:5.

7. The composition according to claim 1, further comprising component (C), wherein component (C) comprises at least one of a stabiliser; a colorant; a clarifier; a surface tension modifier; a lubricant; a flame-retardant; a mould-release agent; a flow improving agent; an anti-static agent; a blowing agent; an inorganic filler, a reinforcing agent; or a component that enhances interfacial bonding between polymer and filler.

8. The composition according to claim 1, wherein the heterophasic propylene copolymer is prepared using a catalyst containing phthalate.

9. The composition according to claim 1, wherein the heterophasic propylene copolymer is prepared using a catalyst having a phthalate content of less than 50 ppm, based on the total weight of the catalyst.

10. A process for the preparation of the composition according to claim 1, comprising melt mixing (A) and (B).

11. A process for preparing an article from the composition according to claim 1, comprising the step of injection moulding of the composition into a mould.

12. An article comprising the composition of claim 1.

13. The article according to claim 12, wherein the article is an injection moulded article.

14. An article that is prepared from the composition according to claim 1, which composition when used in injection moulding of a 5 L container without a lid has a top load of at least 4100N.

15. The composition according to claim 1,
(a) wherein the propylene-based matrix is present in an amount of 84 to 88 wt %, based on the total heterophasic propylene copolymer, and
(b) wherein the dispersed ethylene-α-olefin copolymer is present in an amount of 12 to 16 wt %, based on the total heterophasic propylene copolymer.

16. The composition according to claim 9, wherein the phthalate content is less than 20 ppm, based on the total weight of the catalyst.

17. The composition according to claim 6, wherein the amount of the first nucleating agent is 0.0025 to 0.04 wt %, based on the total weight of the composition, and/or wherein the amount of the second nucleating agent is 0.1 to 5.0 wt %, based on the total weight of the composition.

18. A composition comprising:
(A) a heterophasic propylene copolymer; and
(B) a nucleating composition;
wherein (A) the heterophasic propylene copolymer consists of
(a) a propylene-based matrix, wherein the propylene-based matrix consists of a propylene homopolymer and wherein the propylene-based matrix is present in an amount of 83 to 88 wt %, based on the total heterophasic propylene copolymer, and
(b) a dispersed ethylene-α-olefin copolymer, wherein the dispersed ethylene-α-olefin copolymer is present in an amount of 12 to 17 wt %, based on the total heterophasic propylene copolymer, and
wherein the α-olefin in the ethylene-α-olefin copolymer is propylene,
wherein the sum of the total amount of propylene-based matrix and total amount of the dispersed ethylene-α-olefin copolymer in the heterophasic propylene copolymer is 100 wt %,
wherein the amount of ethylene in the ethylene-α-olefin copolymer is 40 to 60 wt %, and
wherein the heterophasic propylene copolymer has a melt flow index of 35 to 50 g/10 min as determined according to ISO1133 at 230° C. and 2.16 kg,
wherein the heterophasic propylene copolymer is prepared using a catalyst having a phthalate content of less than 100 ppm, based on the total weight of the catalyst; and wherein (B) the nucleating composition comprises
(i) a first nucleating agent, which comprises a cyclic dicarboxylate salt compound, and
(ii) a second nucleating agent, which comprises talc,
wherein the cyclic dicarboxylate salt compound has the formula (I):

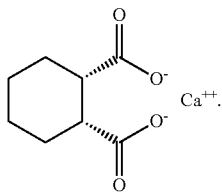

19. A composition comprising:
(A) a heterophasic propylene copolymer; and
(B) a nucleating composition;
wherein (A) the heterophasic propylene copolymer consists of
(a) a propylene-based matrix, wherein the propylene-based matrix consists of a propylene homopolymer and wherein the propylene-based matrix is present in an amount of 83 to 88 wt %, based on the total heterophasic propylene copolymer, and
(b) a dispersed ethylene-α-olefin copolymer, wherein the dispersed ethylene-α-olefin copolymer is present in an amount of 12 to 17 wt %, based on the total heterophasic propylene copolymer, and
wherein the α-olefin in the ethylene-α-olefin copolymer is propylene, wherein the sum of the total amount of propylene-based matrix and total amount of the dispersed ethylene-α-olefin copolymer in the heterophasic propylene copolymer is 100 wt %,
wherein the amount of ethylene in the ethylene-α-olefin copolymer is 40 to 60 wt %, and
wherein the heterophasic propylene copolymer has a melt flow index of 35 to 50 g/10 min as determined according to ISO1133 at 230° C. and 2.16 kg,
wherein the heterophasic propylene copolymer is prepared using a catalyst having a phthalate content of less than 100 ppm, based on the total weight of the catalyst; and
wherein (B) the nucleating composition comprises
(i) a first nucleating agent, which comprises a cyclic dicarboxylate salt compound, and
(ii) a second nucleating agent, which comprises talc,
wherein the cyclic dicarboxylate salt compound has the formula (I):

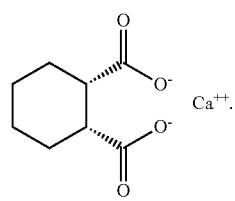

* * * * *